(12) United States Patent
Hirobe (10) Patent No.: US 7,762,674 B2
(45) Date of Patent: Jul. 27, 2010

(54) PROJECTION-TYPE DISPLAY DEVICE (75) Inventor: Toshinori Hirobe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 410 days.

(21) Appl. No.: 11/275,673

(22) Filed: Jan. 24, 2006

(65) Prior Publication Data
US 2006/0164603 A1 Jul. 27, 2006

(30) Foreign Application Priority Data
Jan. 25, 2005 (JP) ............... 2005-016791

(51) Int. Cl.
G03B 21/26 (2006.01)
G03B 21/16 (2006.01)

(52) U.S. Cl. .................... 353/57; 353/61
(58) Field of Classification Search ............. 353/119, 353/61, 60, 58, 57; 349/161, 58
See application file for complete search history.

(56) References Cited

U.S. PATENT DOCUMENTS

| | | | | |
|---|---|---|---|---|
| 6,007,205 A | * | 12/1999 | Fujimori | 353/57 |
| 6,040,877 A | * | 3/2000 | Won | 348/748 |
| 6,450,646 B1 | * | 9/2002 | Ono et al. | 353/57 |
| 6,462,804 B1 | * | 10/2002 | Yamada et al. | 349/161 |
| 6,488,378 B1 | * | 12/2002 | Tabuchi et al. | 353/52 |
| 6,497,489 B1 | * | 12/2002 | Li et al. | 353/61 |
| 6,558,003 B2 | * | 5/2003 | Mihara | 353/52 |
| 6,595,685 B2 | * | 7/2003 | Baba et al. | 374/161 |
| 6,805,446 B2 | * | 10/2004 | Arai et al. | 353/61 |
| 6,851,810 B2 | | 2/2005 | Arai et al. | |
| 7,064,956 B2 | * | 6/2006 | Patel | 361/697 |
| 7,314,280 B2 | * | 1/2008 | Iwase | 353/61 |
| 2002/0008852 A1 | * | 1/2002 | Onishi et al. | 353/57 |
| 2002/0131476 A1 | * | 9/2002 | Baba et al. | 374/161 |
| 2003/0189695 A1 | * | 10/2003 | Arai et al. | 353/77 |
| 2004/0169825 A1 | * | 9/2004 | Ozawa et al. | 353/61 |
| 2005/0117295 A1 | * | 6/2005 | Patel | 361/697 |
| 2005/0242185 A1 | * | 11/2005 | Winkler et al. | 235/454 |
| 2006/0170879 A1 | * | 8/2006 | Kato et al. | 353/77 |
| 2007/0008501 A1 | * | 1/2007 | Yamazaki et al. | 353/97 |
| 2007/0064551 A1 | * | 3/2007 | Mizuno et al. | 369/44.23 |

FOREIGN PATENT DOCUMENTS

| | | |
|---|---|---|
| JP | 11-039934 | 2/1999 |
| JP | 2000-082321 | 3/2000 |
| JP | 2001343708 A * | 12/2001 |

* cited by examiner

*Primary Examiner*—Georgia Y Epps
*Assistant Examiner*—Danell L Owens
(74) *Attorney, Agent, or Firm*—Fitzpatrick, Cella, Harper & Scinto (57) ABSTRACT

A projection-type display device includes a housing, at least a part of which has a hollow wall, and a light source, a light valve, a projection optical system, a reflection mirror, and a screen all disposed in a single, common housing space in the housing. In addition, a first air guide path, provided between the light source and the hollow wall, guides hot air generated by the light source directly to the hollow wall.

5 Claims, 14 Drawing Sheets

FIG. 14

PROJECTION-TYPE DISPLAY DEVICE

BACKGROUND OF THE INVENTION

1. Field of the Invention

The present invention relates to a projection-type display device. More specifically, the present invention relates to a technique for radiating heat generated by a light source.

2. Related Background Art

Figure 13:
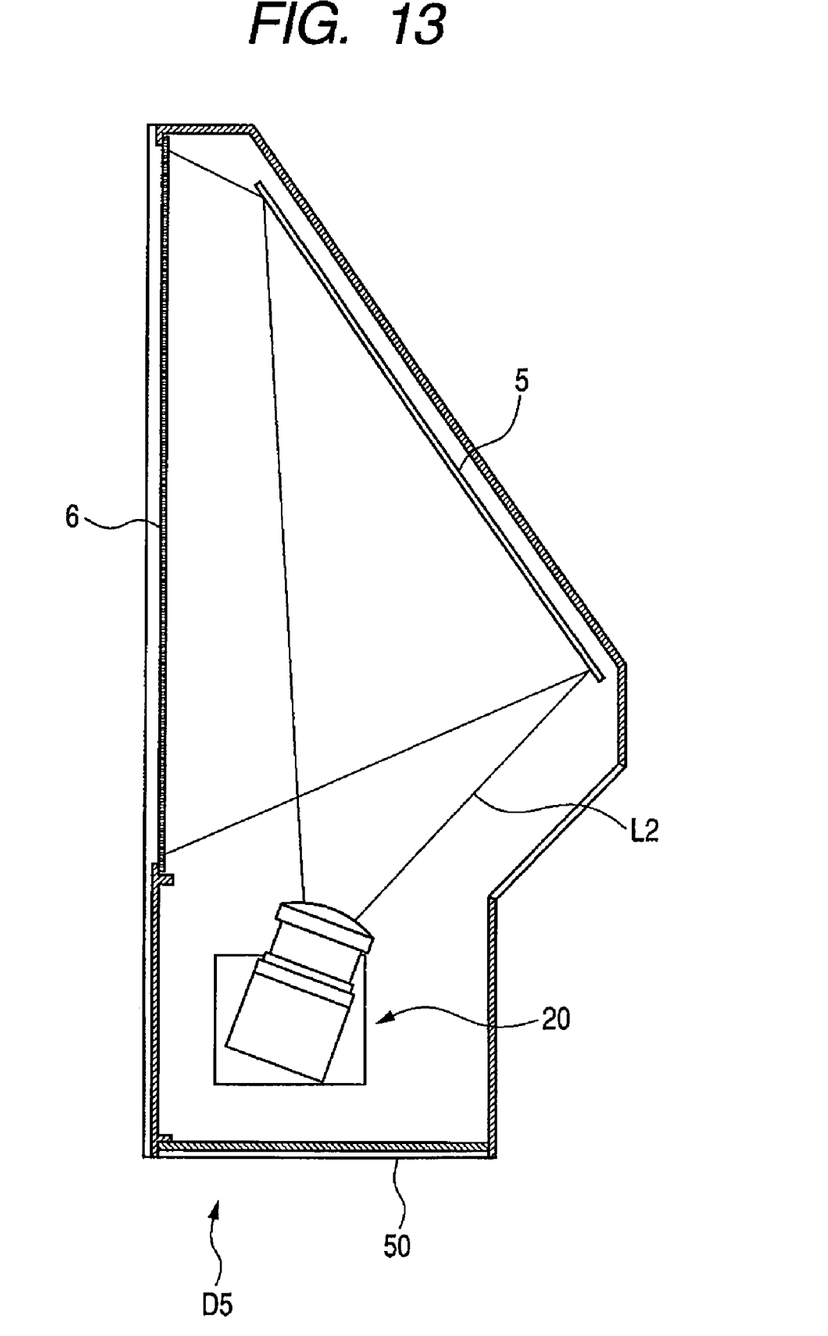
FIG. 13 is a schematic cross-sectional view showing a projection-type display device D5.

FIG. 13 is a schematic cross-sectional view showing a configuration of a projection-type display device D5.

The projection-type display device includes a total reflection mirror 5, a screen 6, a housing 50, and a projection unit 20.

Figure 14:
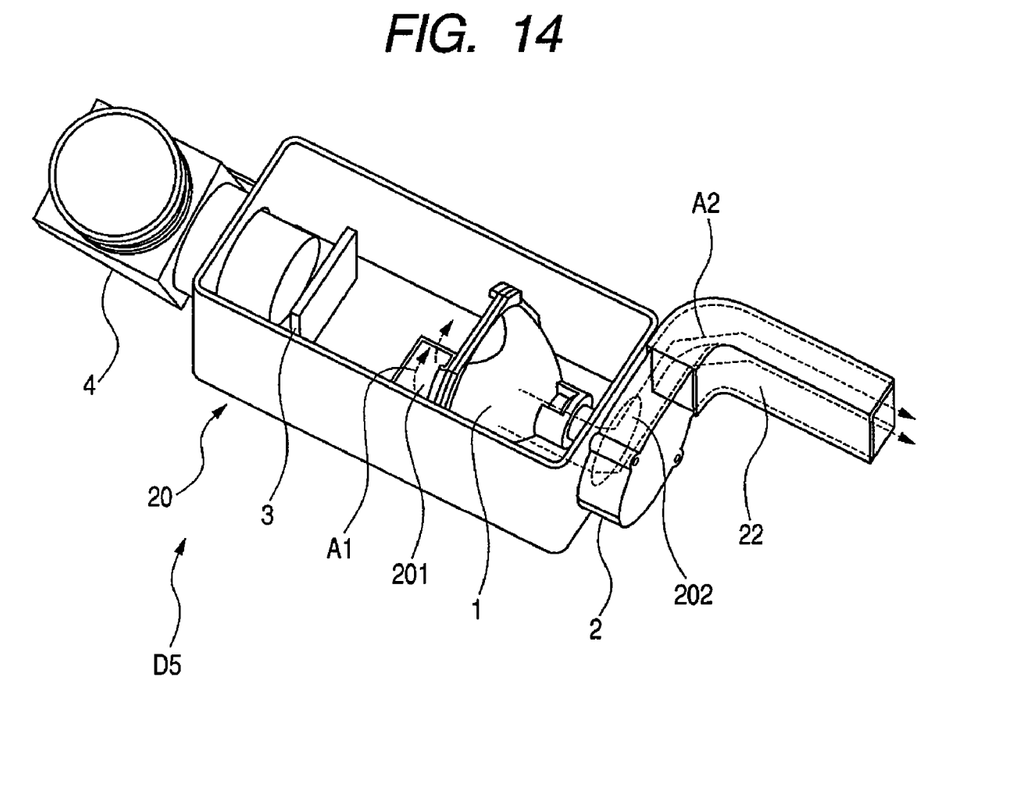
FIG. 14 is a schematic partial cut away perspective view showing a configuration of a projection unit of the projection-type display device D5.

FIG. 14 is a schematic view showing a configuration of the projection unit 20.

The projection unit 20 includes a projection lamp 1, a cooling fan 2, a light valve 3, and a projection lens 4. Projection light from the projection lamp 1 constituting the light source is modulated by the light valve 3, and is projected in an enlarged state by the projection lens 4 onto the screen 6.

The projection unit 20 has a closed structure except for having an intake port 201 for the cooling fan 2 and an opening 202 leading to the cooling fan 2.

In FIG. 14, the projection unit 20 is shown with the upper side being opened for purposes of illustration.

As the projection lamp, a short arc ultra-high pressure mercury lamp or the like is used in many cases.

The projection lamp attains a very high temperature. In particular, both an arc tube and a reflector, which constitute the projection lamp, attain a very high temperature.

As shown in FIG. 14, in the projection unit 20 also, the cooling fan 2 is arranged in the vicinity of the projection lamp 1, and further, the intake port 201 is formed, so the projection lamp 1 is cooled by the cooling fan 2, and air whose temperature has been raised is discharged to the outside of the projection unit 20.

Examples of the projection lamp cooling method using a cooling fan are disclosed in Japanese Patent application Laid-Open Nos. H11-39934 and 2000-82321.

As shown in FIG. 14, a cooling air A1 generated by taking in air through the intake port 201 cools the projection lamp 1 to become a hot air A2 of high temperature.

The discharge of the hot air to the outside of the projection unit 20 as described above means that the hot air is discharged into the inside of the housing 50. As a result, the temperature inside the housing rises, and the other components disposed in the housing 50 are heated, which adversely affects the performance of the projection-type display device. Further, the heat is also imparted to the light valve 3, which is disposed together with the projection lamp inside the optical unit (projection unit).

In view of this, the present inventor has made an attempt to discharge the hot air A2 used for cooling the projection lamp 1 directly from the projection unit 20 to the outside of the projection-type display device through an exhaust port (not shown) provided in the housing 50.

In this regard, in order that the position of the exhaust port of the housing 50 may be determined arbitrarily without involving any temperature rise in the housing 50, the present inventor has studied a display device which is constructed such that the hot air A2 is discharged to the outside of the projection-type display device by use of an exhaust duct 22.

However, there is a possibility, because of the hot air A2, that an object existing in the vicinity of the exhaust port of the housing 50 (e.g., a wall of a room in which the projection-type display device is installed, a furniture such as a desk, or a person using the projection-type display device to perform presentation, etc.) may be subjected to a high temperature.

SUMMARY OF THE INVENTION

It is, therefore, an object of the present invention to provide a projection-type display device which can radiate heat generated by a light source without affecting the performance of articles disposed in a housing and which does not warm objects existing outside and in the vicinity of the projection-type display device to a high temperature.

Accordingly, the present invention provides a projection-type display device comprising in a housing, a light source, a light valve, a projection optical system, a reflection mirror, and a screen, wherein at least a part of the housing comprises a hollow wall formed of an extruded member, and the hollow wall is a heat radiation wall for radiating heat generated by the light source.

According to the present invention, by using a member obtained by extrusion as a housing and by utilizing a hollow portion thereof, it becomes possible to provide a projection-type display device which can radiate heat generated by a light source without affecting the performance of articles existing in the housing and which does not warm objects existing outside and in the vicinity of the projection-type display device to a high temperature.

DESCRIPTION OF THE PREFERRED EMBODIMENTS

In accordance with the present invention, there is provided a projection-type display device comprising in a housing, a light source, a light valve, a projection optical system, a reflection mirror, and a screen, wherein at least a part of the housing comprises a hollow wall formed of an extruded member, and the hollow wall is a heat radiation wall for radiating heat generated by the light source.

After extensive study, the present inventor has found the following.

When hot air is discharged to the outside of a housing of a projection-type display device, the discharged heat is absorbed outside.

At that time, a portion of the projection-type display device near the discharge port is warmed by the discharge of the hot air, and the thus warmed region is restricted to the right vicinity of the discharge port.

After studying the cause of the above phenomenon, the present inventor has found out that it is because the housing wall is formed of a single solid plate.

In this connection, the present inventor has paid attention to the effect of forming the housing wall of a hollow member.

By passing the hot air from the light source through a hollow portion of a hollow wall, it is possible to prevent conduction of heat into the housing by means of an inner one of the walls constituting the hollow portion, and also to prevent the heat from warming objects existing outside the projection-type display device to high a temperature by means of an outer one of the walls of the hollow portion.

More specifically, the following advantage can be attained with this configuration.

The housing wall has a large surface. Therefore, by utilizing the wall of a large surface on the outer side of the housing for heat radiation, it is possible to prevent objects existing in the vicinity of the projection-type display device from being subjected to a high temperature. Because the projection-type display device has a housing of a large surface, it is possible to freely utilize the large surface.

For example, it is conceivable to provide a heat radiation plate in the form of a single solid plate-like wall outside a projection-type display device. In that case, however, further consideration in terms of disposing position and shape of the wall becomes necessary from the viewpoint of design, that is, from the aesthetic viewpoint. Further, by providing such a heat radiation plate, the size of the entire projection-type display device will be increased. On the contrary, with the projection-type display device according to an embodiment of the present invention, the wall itself is formed of a hollow member which functions as a heat radiation plate, so that there is no need to increase the size of the device.

In a projection-type display device according to an embodiment of the present invention, the hollow wall may be disposed at any position in the housing wall. For example, it is possible to form the entire housing of a hollow wall, or to form only a portion required to function as a heat radiation wall of a hollow member and form the other portion of a single solid plate-shaped member.

As the housing wall of a projection-type display device according to an embodiment of the present invention, it is preferred to adopt a wall of a configuration such that there is provided a partition between a wall which faces the inside of the housing and a wall which faces the outside of the housing. By adopting such a configuration, it is possible to achieve an increase in the strength of the portion between the wall facing the inside of the housing and the wall facing the outside of the housing.

More specifically, it is preferred to form the housing wall of an extruded member. In this case, it is possible to freely shape the hollow portion of the housing wall.

As the material of the housing of a projection-type display device according to an embodiment of the present invention, metal can be used.

More preferably, aluminum is used. Aluminum is preferable since it has a light weight and a high thermal conductivity and provides a satisfactory heat radiation effect. Further, aluminum is also preferable as a material for a housing which is formed of an extruded member. As the aluminum material, there may be used aluminum and alloys thereof. Preferred examples of such aluminum material include JIS A6063 which is an Al/Mg/Si alloy.

A projection-type display device according to an embodiment of the present invention may have an opening for discharging hot air to the outside of the projection-type display device. In this case, the hot air undergoes partial heat radiation toward the outside of the projection-type display device by means of the surface of the hollow wall facing the outside of the housing prior to its discharge through the opening to the outside of the projection-type display device, so that the temperature of the hot air when leaving the opening is low.

Further, a projection-type display device in accordance with an embodiment of the present invention may have an air guide path for guiding hot air containing heat generated by a light source to a hollow portion of a hollow wall, and an air guide path for guiding the air whose heat has been radiated at the hollow wall to the light source again, with a region formed by communication between the two air guide paths and the hollow wall being closed to (i.e., being not in communication with) the outside of the housing. That is, it is possible to send the hot air from the light source to the hollow wall to cause it to be cooled there, and then restore the air into the housing again without discharging it to the outside of the projection-type display device to cool the articles in the housing (e.g., the light source). In this case, no air flow is released to the outside of the projection-type display device, so that it is possible to substantially reduce noise due to wind outside the projection-type display device. Further, since there is no need to take in air from outside, it is possible to prevent intrusion of dust into the housing.

As described above, the projection-type display device according to an embodiment of the present invention can discharge heat generated by a light source without affecting the performance of articles existing within a housing, and does not warm objects existing outside and in the vicinity of the projection-type display device to a high temperature.

Thus, it is possible to provide a projection-type display device with an increased degree of freedom in disposing position.

Incidentally, the term "duct" herein employed refers to a housing wall or hollow wall through which air is allowed to pass.

EXAMPLE 1

In the following, Example 1 of the present invention will be described with reference to FIGS. 1 to 7.

In the present example, the present invention is applied to a rear-projection liquid crystal projection device in which a projection light from a projection lamp is modulated by a transmissive liquid crystal panel, and the modulated light is then projected in an enlarged state onto a screen by a projection lens.

Figure 1:
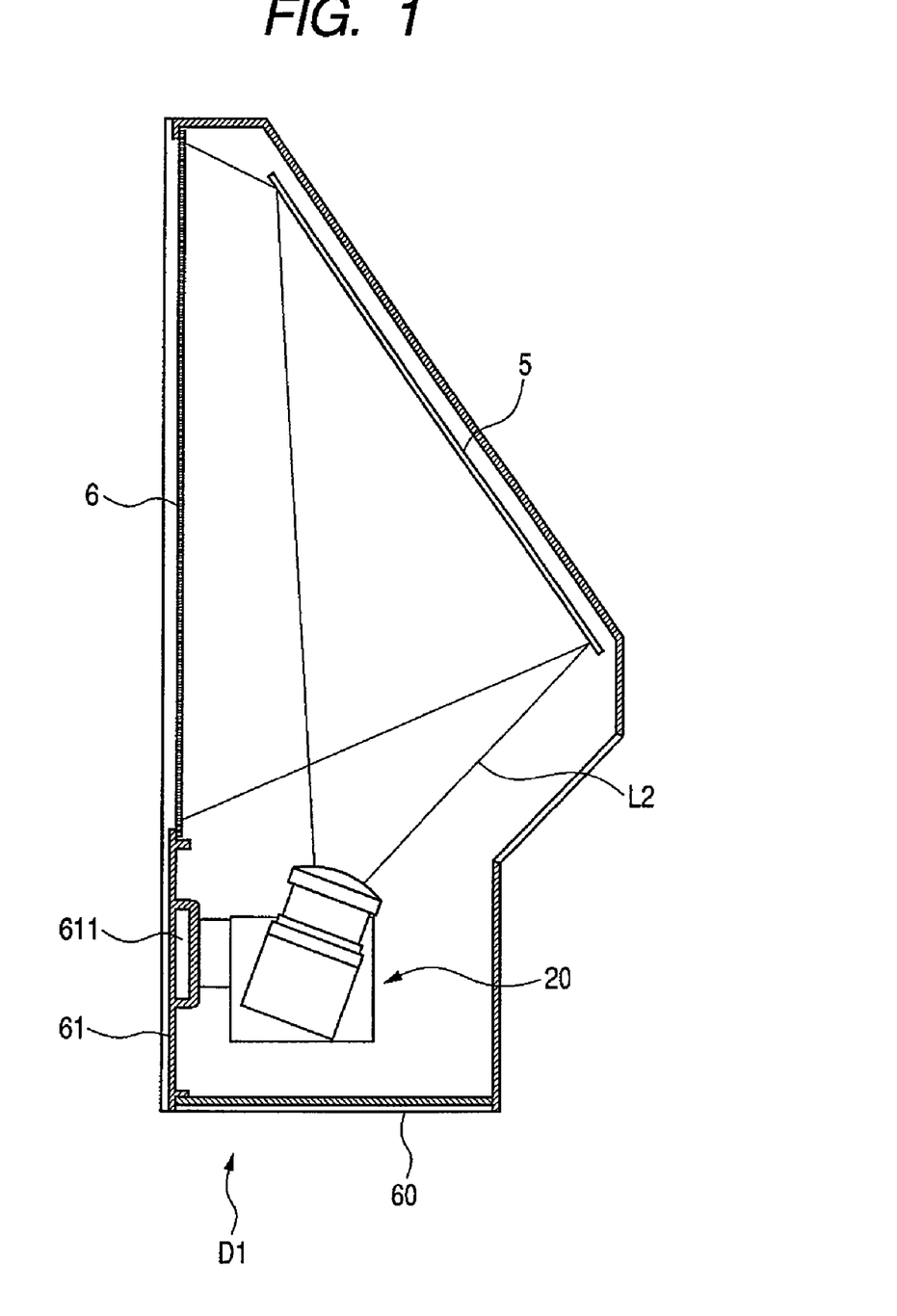
FIG. 1 is a schematic cross-sectional view showing a projection-type display device D1 according to Example 1 of the present invention.

FIG. 1 is a schematic cross-sectional view showing a configuration of a projection-type display device D1 according to Example 1 of the present invention.

In FIG. 1, the projection-type display device D1 includes a projection unit 20 which modulates a projection light from a projection lamp by a light valve, and projects the modulated light in an enlarged state by a projection lens, a total reflection mirror 5 which reflects the projection light L2 from the projection unit 20, a screen 6, and a housing 60 thereof.

Figure 2:
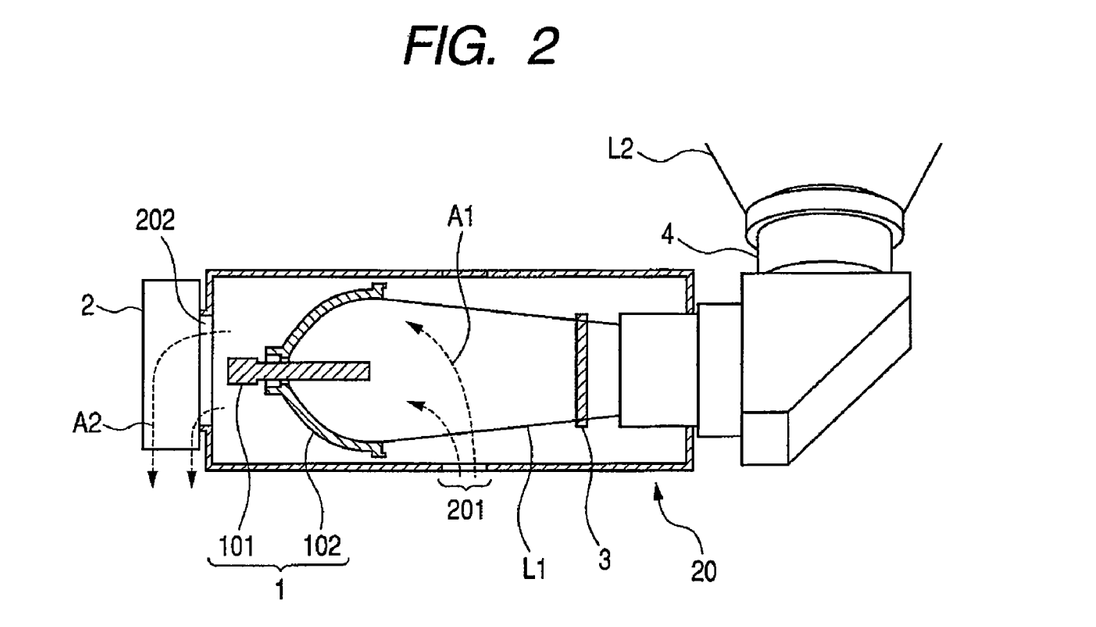
FIG. 2 is a schematic partial cross-sectional view showing a configuration of a projection unit of the projection-type display device D1 according to Example 1 of the present invention.

FIG. 2 is a schematic partial cross-sectional view showing a configuration of the projection unit 20. The projection unit 20 includes a projection lamp 1 that is composed of an arc tube 101 and a reflector 102, a cooling fan 2, a light valve 3 that is formed of a transmissive liquid crystal panel, and a projection lens 4. A projection light L1 from the projection lamp 1 as the light source is modulated by the light valve 3, and is projected in an enlarged state (L2) onto the screen 6 by the projection lens 4.

The projection unit 20 is provided with an intake port 201 for cooling the projection lamp 1 by the cooling fan 2, and the cooling fan 2 is provided in the vicinity of the projection lamp 1. Therefore, cooling air taken in through the intake port 201 passes the projection lamp 1, then passes through the opening 202, and is discharged out of the optical unit (projection unit) 20 by the cooling fan 2.

Here, as the cooling fan 2, a sirocco fan is used, in which the intake direction and the exhaust direction are perpendicular to each other.

Further, the optical unit (projection unit) 20 is closed except for having the intake port 201 for the cooling fan 2 and the opening 202 of the cooling fan 2.

In the projection unit 20, cooling air A1 taken in through the intake port 201 by the cooling fan 2 cools the projection lamp 1 to become hot air A2 whose temperature has been raised.

On the device front side of the housing 60, there is provided, as an external wall member, an extruded member 61 that is formed of an aluminum alloy, which is a metal excellent in thermal conductivity, and is configured such that its section includes a duct 611.

Figure 3:
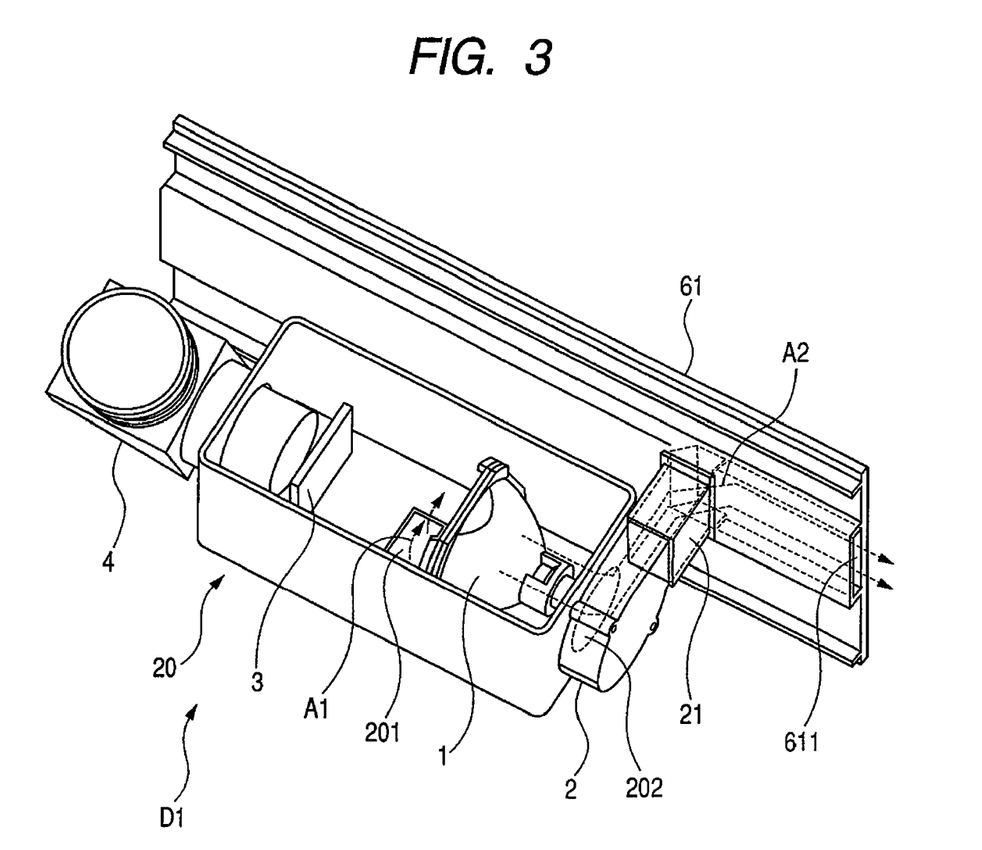
FIG. 3 is a schematic partial cut away perspective view showing a configuration of an external wall member and the projection unit of the projection-type display device D1 according to Example 1 of the present invention.
Figure 4:
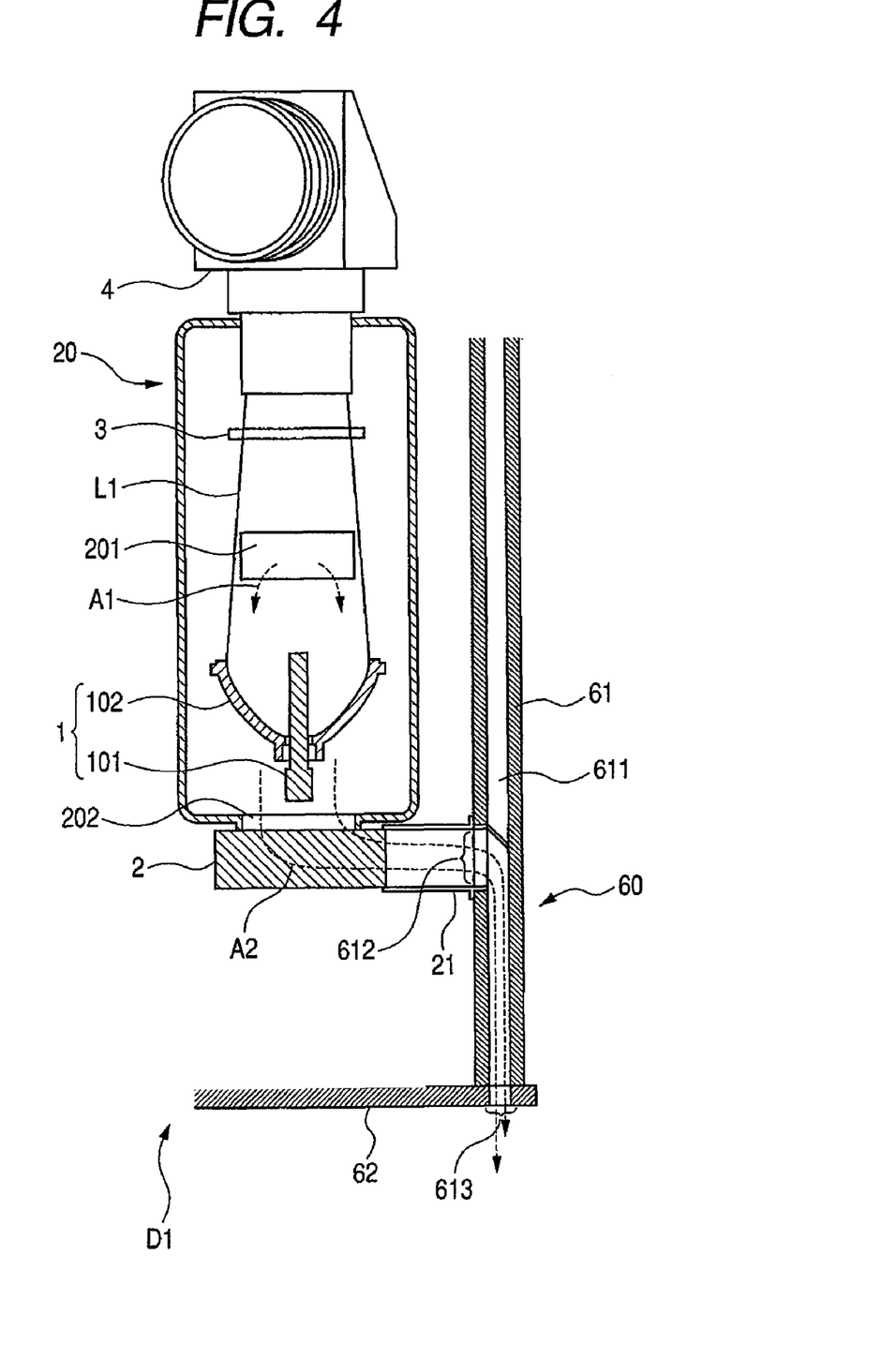
FIG. 4 is a schematic cross-sectional view showing the configuration of the external wall member and the projection unit of the projection-type display device D1 according to Example 1 of the present invention.
Figure 5:
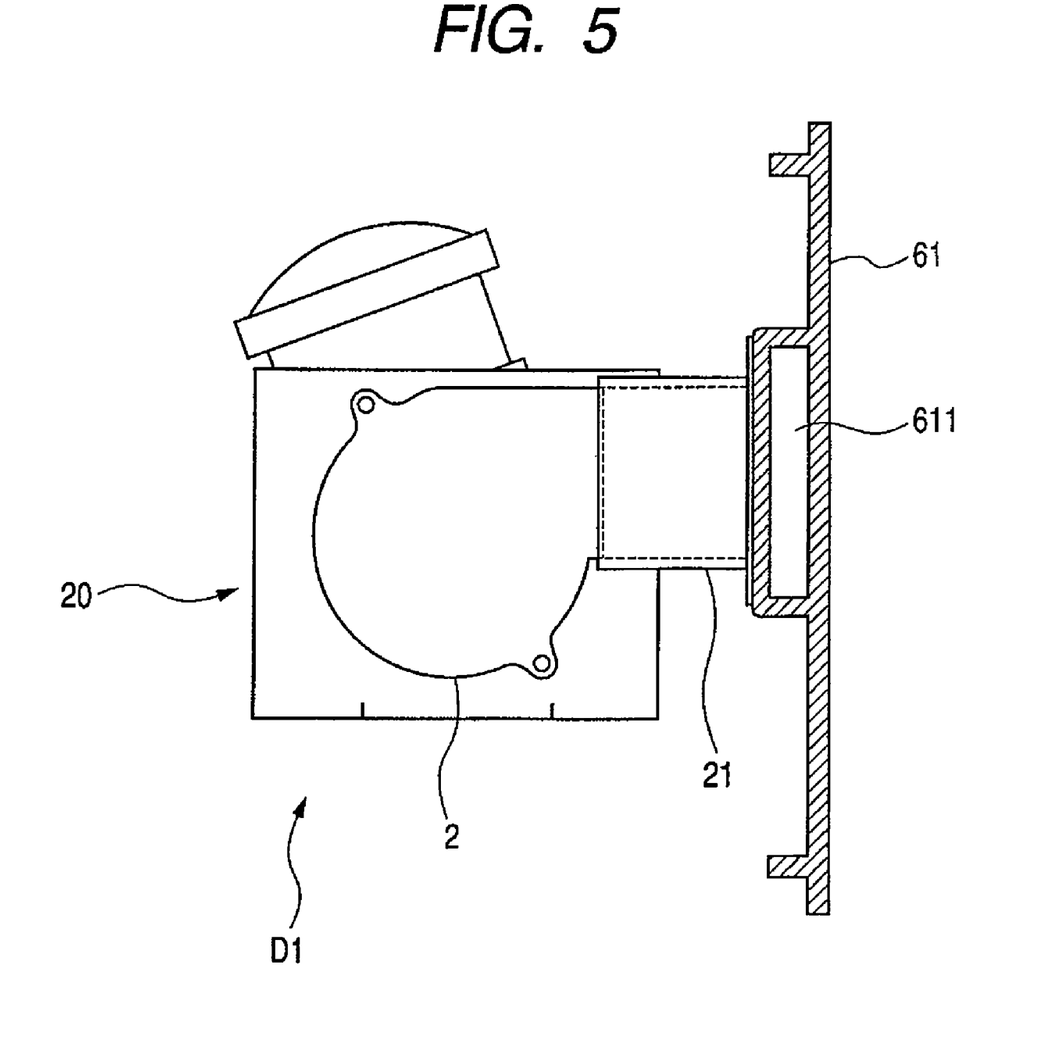
FIG. 5 is a schematic partial cross-sectional view showing the configuration of the external wall member and the projection unit of the projection-type display device D1 according to Example 1 of the present invention.

FIGS. 3, 4, and 5 are schematic views showing a configuration of the projection unit 20 and the extruded member 61. FIG. 4 is a cross-sectional view of the projection unit 20 and the extruded member 61 of FIG. 3 taken along a plane perpendicular to the height direction of the device, and FIG. 5 is a partial cross-sectional view of the projection unit 20 and the extruded member 61 of FIG. 3 taken along a plane parallel to the height direction of the device.

Incidentally, in FIG. 3, for purposes of illustration, the projection unit 20 is shown with the upper side being opened.

In FIGS. 3, 4, and 5, the duct 611 has an opening 612 formed on the inner side of the projection-type display device and an exhaust port 613 formed on the outer side of the projection-type display device.

Further, between the exhaust side of the cooling fan 2 and the duct 611, there is provided an air guide duct 21 so as to establish communication between the exhaust side of the cooling fan 2 and the duct 611 through the opening 612.

With this configuration, the hot air A2, which is discharged by the cooling fan 2 and raised in temperature by cooling the projection lamp 1, is guided to the duct 611 via the air guide duct 21, then passes through the duct 611, and is discharged to the outside of the projection-type display device through the exhaust port 613.

Here, at a portion of the air guide duct 21 which is connected to the duct 611 through the opening 612, it is preferable to form an air guide shape such that the hot air A2 flows toward the exhaust port 613 formed at the duct 611.

Further, because the distance from the cooling fan 2 to the exhaust port 613 is large, it is preferred to use a high static pressure sirocco fan as the cooling fan 2.

According to the present example, the extruded member 61 is formed of an aluminum alloy which is a metal with a high thermal conductivity. Further, it is an external wall member and is therefore exposed to the atmospheric air, which is at a temperature lower than that of the hot air A2.

That is, the extruded member 61, due to its heat conduction effect, when the hot air A2 passes therethrough, functions as a heat radiation member which uses the inner side of the duct 611 as a heat receiving surface, and the surface exposed to the atmospheric air as a heat radiation surface.

Thus, the temperature of the hot air A2 when discharged to the outside of the housing 60 through the exhaust port 613 is lower as compared with its temperature when discharged from the cooling fan 2, so that it is possible to reduce the possibility of raising the temperature of other structures disposed in the vicinity of the exhaust port 613 of the housing 60 to damage the structures, and to minimize the danger of causing a user, who is in the vicinity of the exhaust port 613, to feel offended or to suffer burns, etc.

Incidentally, while in this embodiment the present invention has been described in connection with the use of the aluminum alloy as the material of the extruded member, it should be understood that the description is not intended to limit the scope of the invention and it is also possible to use other metals, such as a magnesium alloy.

Further, while in this embodiment the extruded member 61, which is an external wall member on the front side of the device, is used, and the exhaust port 613 is provided in a side surface of the device, the present invention is not limited thereto and it is also possible to use any external wall surface. Further, the position of the exhaust port may be determined arbitrarily.

Further, it is also possible to form a duct in a plurality of extruded members, respectively and connect the duct portions to each other. In this case, it is only necessary to form at least one of the extruded members of a metal with a high thermal conductivity.

Further, the present invention is not limited to a rear-projection display device, but is also applicable to a front-projection display device.

EXAMPLE 2

In the following, Example 2 of the present invention will be described with reference to FIGS. 6 and 7.

The configuration of this embodiment is substantially similar to that of Example 1. The elements that are common to Examples 1 and 2 are indicated by the same reference symbols, and description of such elements will be omitted.

In this embodiment, on the front side of the housing of the projection-type display device D2, there is provided, as an external wall member, an extruded member 71 that is formed of an aluminum alloy, which is a metal excellent in thermal conductivity, and is configured such that its section forms a duct 711 through combination with an auxiliary member 72.

Figure 6:
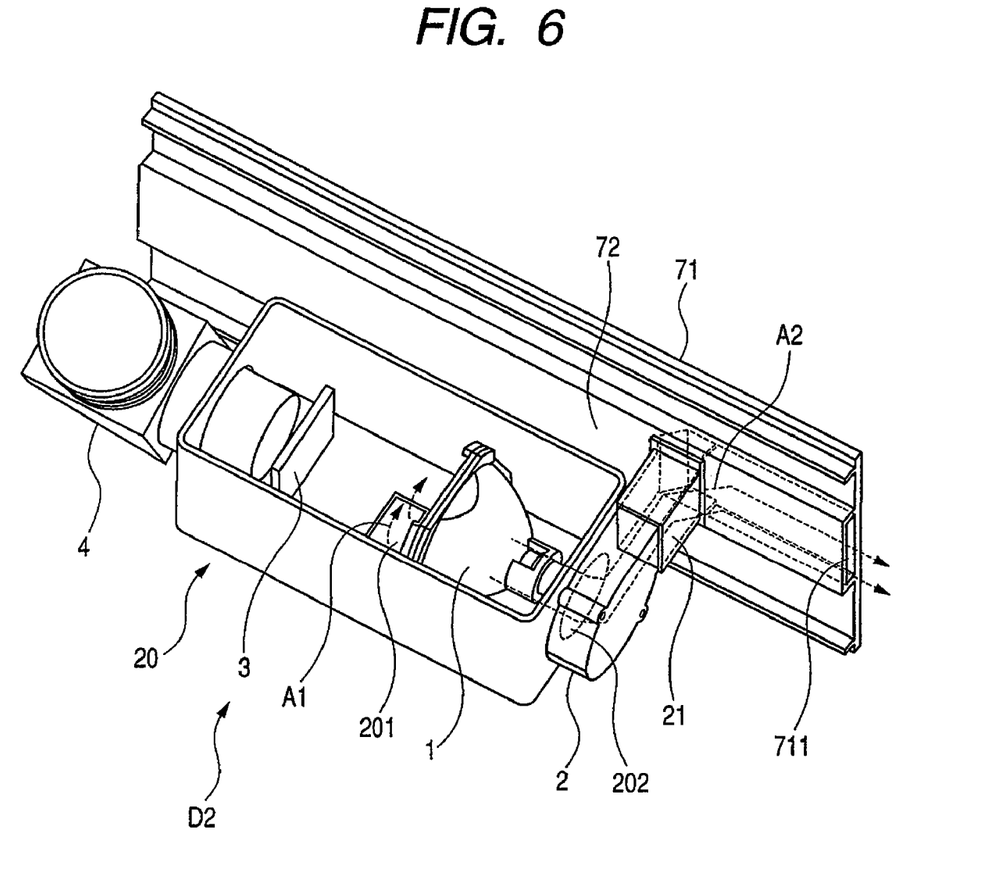
FIG. 6 is a schematic partial cut away perspective view showing a configuration of an external wall member and a projection unit of a projection-type display device D2 according to Example 2 of the present invention.
Figure 7:
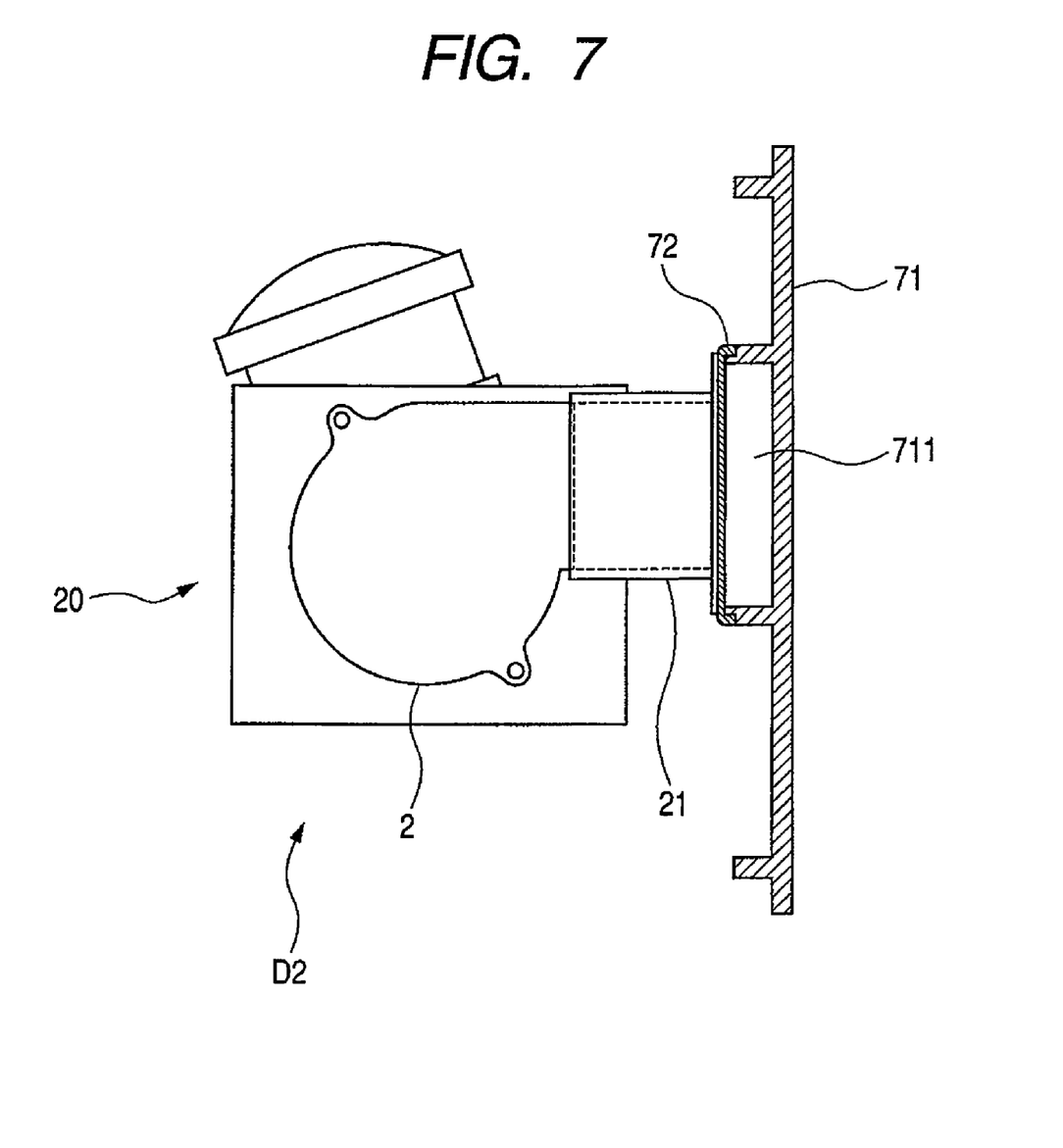
FIG. 7 is a schematic partial cross-sectional view showing the configuration of the external wall member and the projection unit of the projection-type display device D2 according to Example 2 of the present invention.

FIG. 6 is a schematic partial cut away perspective view showing a configuration of the projection unit 20 and the extruded member 71, and FIG. 7 is a partial cross-sectional view of the projection unit 20 and the extruded member 71 taken along a plane parallel to the height direction of the device.

In the device D2, the auxiliary member 72 is provided on the inner side of the housing, and is formed of a material with a lower thermal conductivity as compared with that of the extruded member 71, for example, a plastic material, such as ABS.

With the configuration according to the present example, in addition to the effect exhibited by the configuration of Example 1, it is further possible to attain the effect that the auxiliary member 72 has a lower thermal conductivity than that of the extruded member 71 and therefore has less function as a heat radiation member, so that radiation of heat of the hot air A2 to the inside of the device can be reduced, thereby suppressing the phenomenon that the temperature inside the device is raised to detrimentally affect the performance of the other components in the device such as the light valve 3 and the like.

Incidentally, the auxiliary member 72 does not need to be necessarily provided separately from the air guide duct 22 and may be provided integratedly with the air guide duct 22.

EXAMPLE 3

In the following, Example 3 of the present invention will be described with reference to FIGS. 8 and 9.

The configuration of the present example is substantially similar to that of Examples 1 and 2. The elements that are common to Examples 1, 2 and 3 are indicated by the same reference symbols, and description of such elements will be omitted.

In the present example, on the front side of the device D3, there is provided, as an external wall member, an extruded member 81 that is formed of an aluminum alloy, which is a metal excellent in thermal conductivity, and configured such that its section includes a duct 811.

Figure 8:
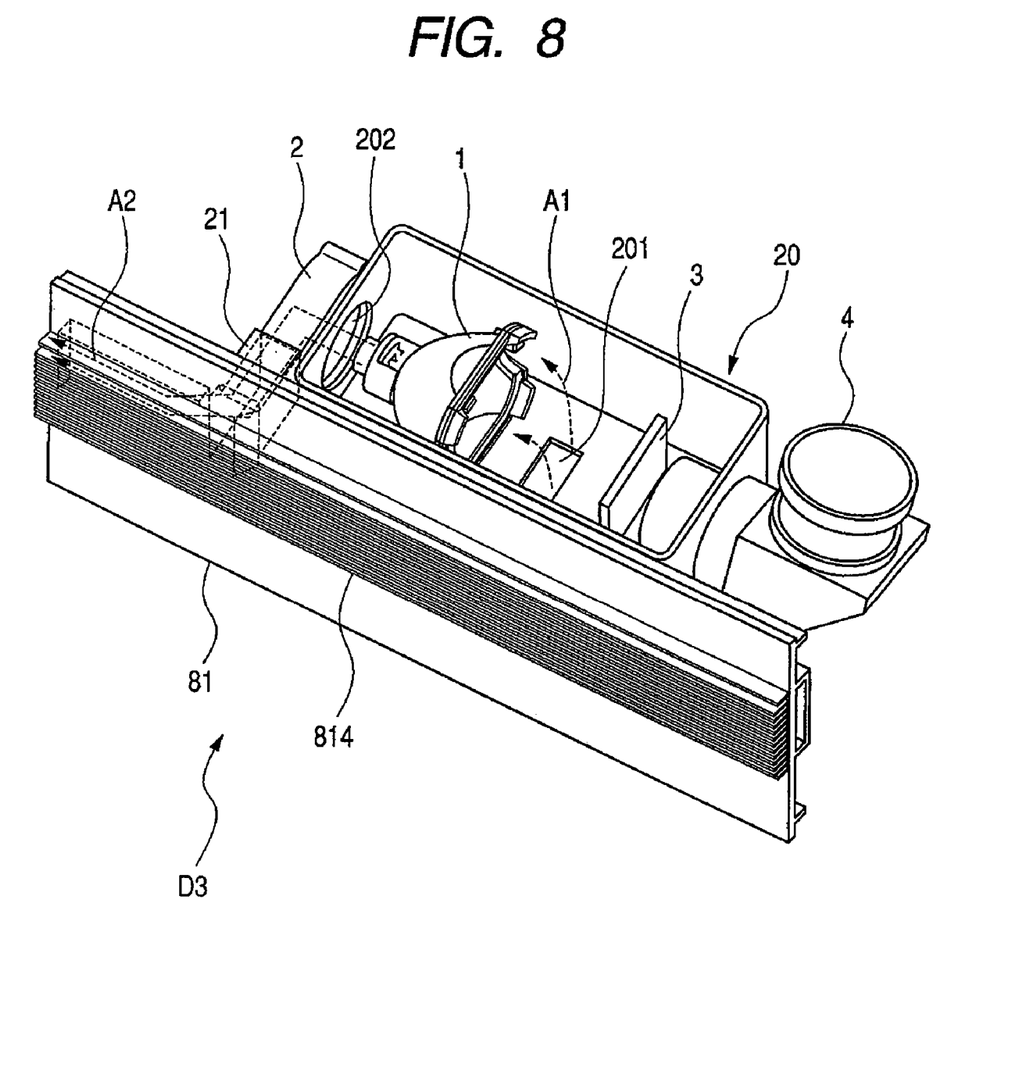
FIG. 8 is a schematic partial cut away perspective view showing a configuration of an external wall member and a projection unit of a projection-type display device D3 according to Example 3 of the present invention.
Figure 9:
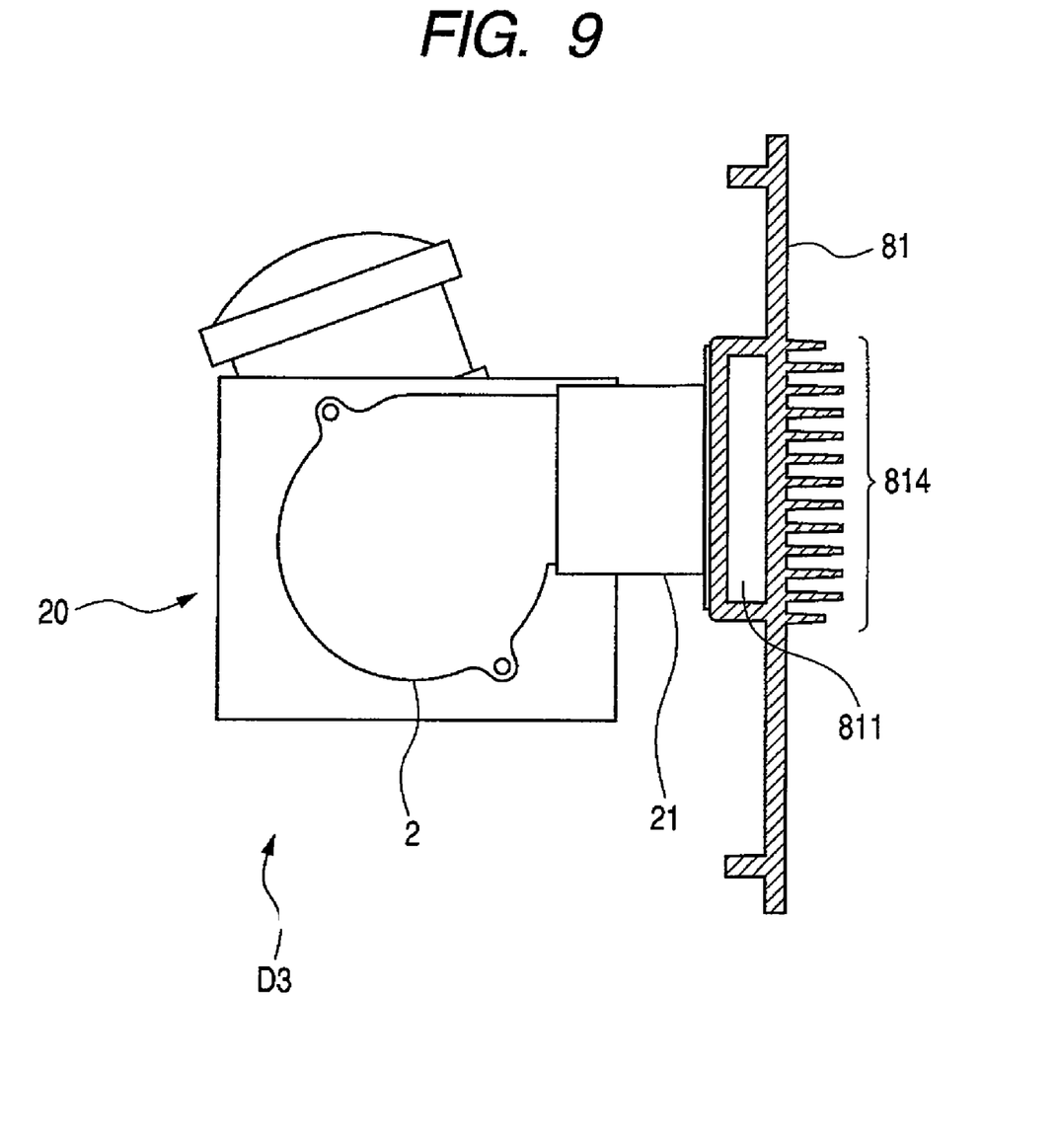
FIG. 9 is a partial cross-sectional view showing the configuration of the external wall member and the projection unit of the projection-type display device D3 according to Example 3 of the present invention.

FIG. 8 is a schematic partial cut away perspective view showing a configuration of the projection unit 20 and the extruded member 81, and FIG. 9 is a partial cross-sectional view of the projection unit 20 and the extruded member 81 taken along a plane parallel to the height direction of the device.

In the device D3, the extruded member 81 through which the hot air A2 passes is formed so as to have a cross-sectional shape with a fin-shaped portion 814 on the outer side thereof, that is, on the heat radiation surface of the extruded member 81 which is in contact with the atmospheric air.

With the configuration according to the present example, in addition to the effect exhibited by the configuration of Example 1 or 2, there is further obtained the effect that the surface area of the heat radiation surface that is in contact with the atmospheric air increases because of having the fin-shaped portion to improve the effect of the extruded member 81 as a heat radiator.

EXAMPLE 4

In the following, Example 4 of the present invention will be described with reference to FIGS. 10 and 11.

The configuration of the present example is substantially similar to that of Examples 1 to 3. The elements that are common to Examples 1 to 4 are indicated by the same reference symbols, and description of such elements will be omitted.

As with Example 1 described above, in the present example, there is provided, on the front side of the device D4, as an external wall member, an extruded member 61 that is formed of an aluminum alloy, which is a metal excellent in thermal conductivity, and is configured such that its section includes a duct 611. Further, a heat radiation member 91 with a fin-shaped portion is bonded to the extruded member 61.

Figure 10:
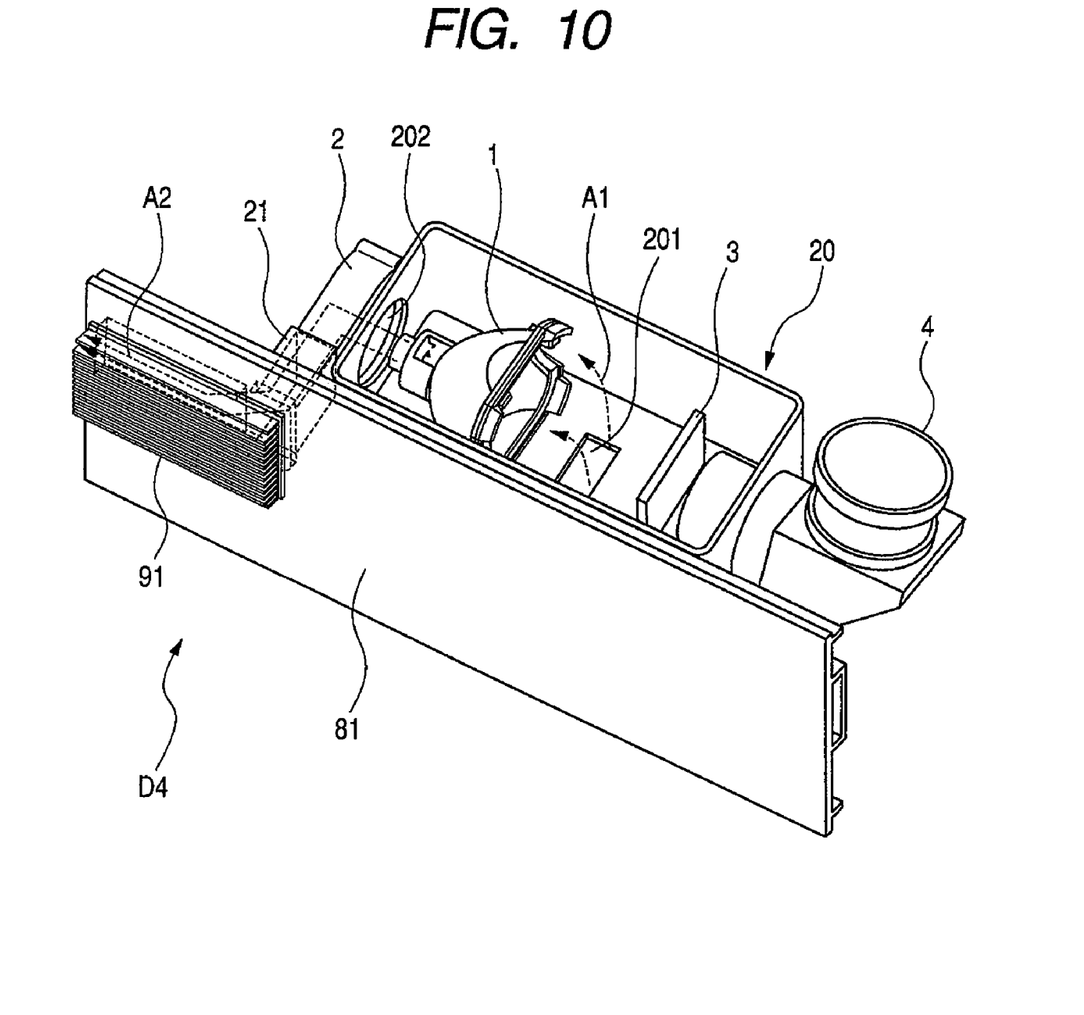
FIG. 10 is a schematic partial cut away perspective view showing a configuration of an external wall member and a projection unit of a projection-type display device D4 according to Example 4 of the present invention.
Figure 11:
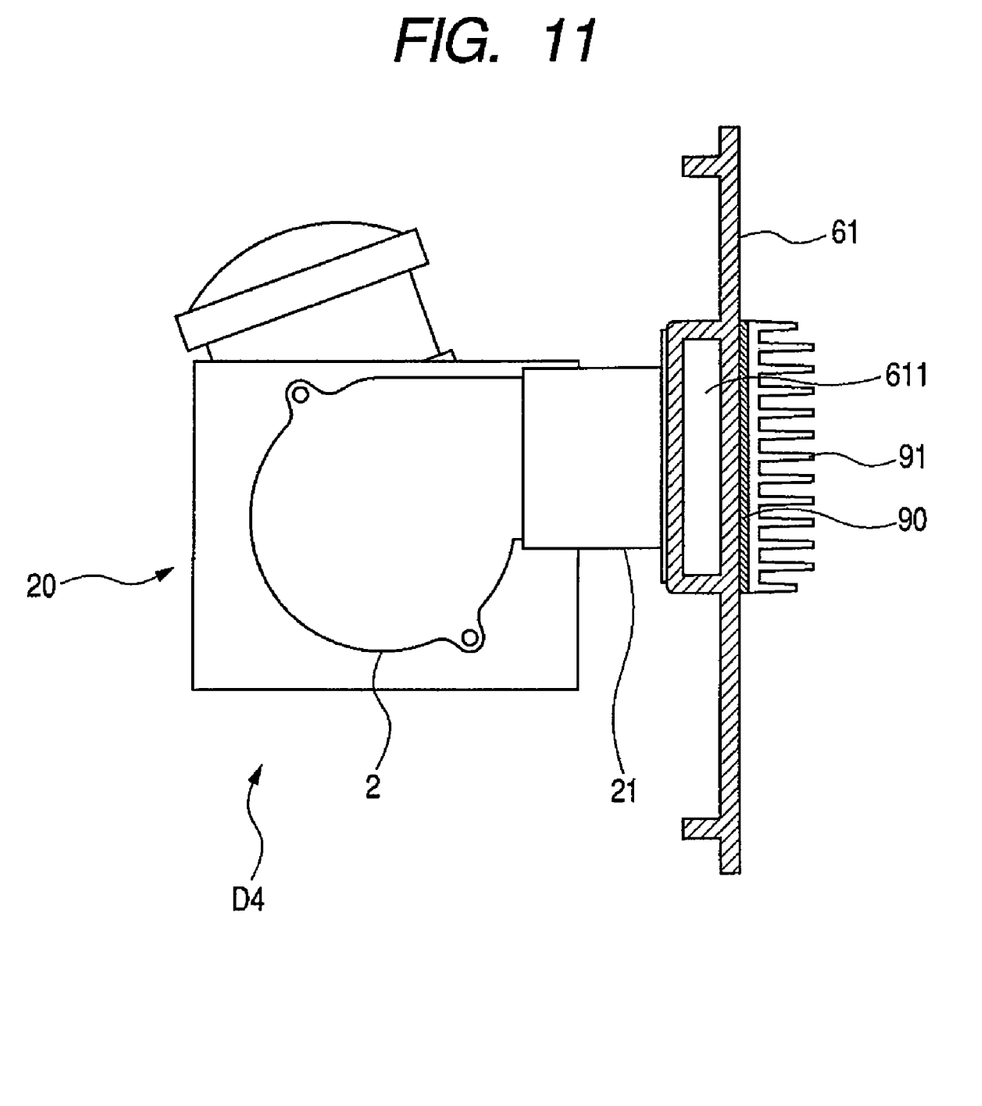
FIG. 11 is a partial cross-sectional view showing the configuration of the external wall member and the projection unit of the projection-type display device D4 according to Example 4 of the present invention.

FIG. 10 is a schematic partial cut away perspective view showing a configuration of the projection unit 20, the extruded member 61 and the heat radiation member 91, and FIG. 11 is a partial cross-sectional view of the projection unit 20, the extruded member 61 and the heat radiation member 91 taken along a plane parallel to the height direction of the device.

In the device D4, instead of forming a fin-shaped portion on the extruded member having a duct formed therein as described in Example 3, the heat radiation member 91 as a heat sink is bonded to the outer side of the extruded member 61 (or the housing) through which the hot air A2 passes, via a heat conduction member 90.

With this configuration, in addition to the effect exhibited by Example 3 described above, it is further possible to control the heat radiation effect by suitably designing the shape of the heat radiation member 91 as the heat sink.

Further, when an electronic component having a cooling effect, such as a Peltier element, is adopted as the heat radiation member, it is possible to further improve the above-mentioned heat radiation effect.

EXAMPLE 5

The projection-type display device of the present example is the same as any one of the devices of Examples 1 to 4 except for having an air guide path for guiding hot air containing heat generated by a light source to a hollow portion of a hollow wall, and an air guide path for guiding the air whose heat has been radiated at the hollow wall to the light source again, with a region formed by communication between the two air guide paths and the hollow wall being closed to (i.e., being not in communication with) the outside of the housing.

Figure 12A:
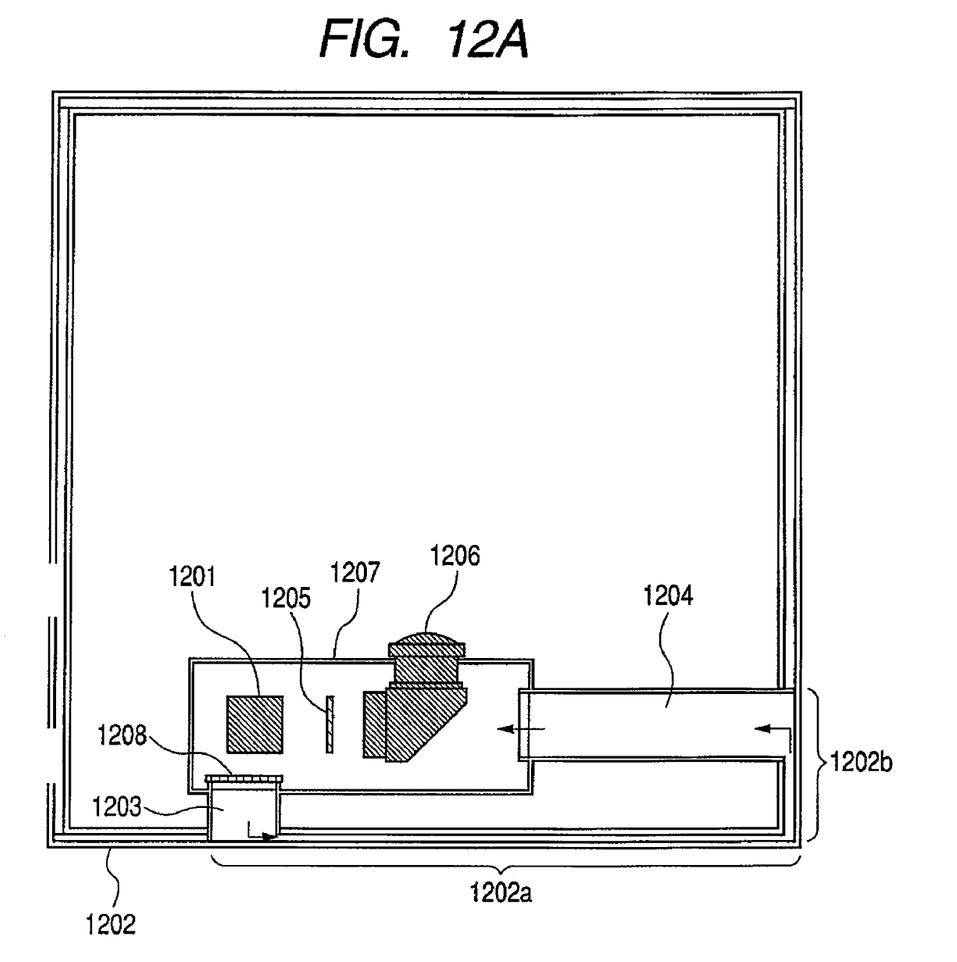
FIGS. 12A and 12B are schematic cross-sectional views of an external wall member and air guide paths in a projection-type display device according to Example 5 of the present invention.

A light source 1201 is contained in a container 1207. The light source 1201 is cooled by a blower (not shown). In FIG. 12A, arrows indicate airflow. The hot air which has passed the light source 1201 is sent to a hollow wall constituting a housing 1202.

The heat of the hot air sent to the hollow wall is radiated through the outer one of the hollow wall constituting the external surface of the housing. Reference numerals 1202a and 1202b denote regions of the external surface of the housing where such heat radiation is effected. In the present example, the regions where heat radiation is effected constitute a part of the housing. Of course, a device configuration can also be adopted in which such heat radiation region occupy the entire external surface of the housing.

In the present example, there are provided an air guide path 1203 for guiding the hot air containing the heat generated by the light source to the hollow portion of the hollow wall, and an air guide path 1204 for guiding the air that has radiated heat at the hollow wall to the light source again. Thus, the air circulates within a closed space formed by communication of the hollow wall constituting the housing 1202, the two air guide paths 1203 and 1204, and the container 1207. That is, the air is discharged neither to a space which is outside of the container 1207 and inside of the housing 1202 nor to the outside of the housing 1202. A light valve 1205, an optical system (lens, mirror, etc.) 1206, and a filter 1208 are provided in the container 1207 as needed.

Figure 12B:
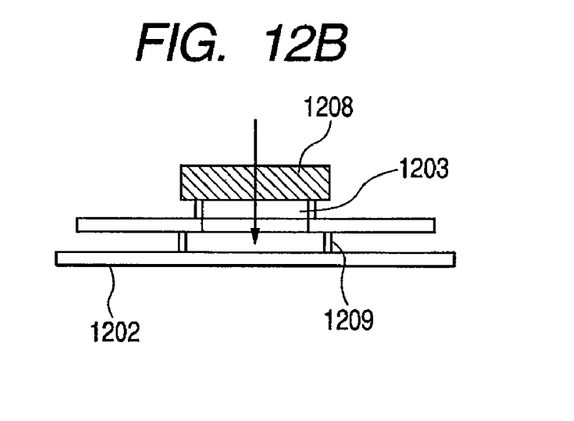

FIG. 12B is a schematic enlarged view showing the air guide path 1203 for guiding the hot air containing the heat generated by the light source to the hollow portion of the hollow wall, and the vicinity thereof. An arrow indicates a direction in which the hot air flows. The housing 1202 is formed of the hollow wall, which is reinforced by a partition 1209. By changing the direction of the partition 1209, it is also possible to change the direction in which the hot air passes through the housing. Further, it is also possible to provide a hole (not shown) in the partition.

As is the case with the foregoing examples, it is preferred also in the present example that the housing is formed of an extruded member. More specifically, it is desirable to use the above-mentioned preferred aluminum material as the material of the extruded member.

With the projection-type display device according to the present example, because the airflow passage is closed, an effective noise reduction can be achieved.

This application claims priority from Japanese Patent Application No. 2005-016791 filed Jan. 25, 2005, which is hereby incorporated by reference herein.

What is claimed is:

1. A projection display device comprising:
    a housing, at least a part of which comprises a hollow wall;
    a light source, a light valve, a projection optical system, a reflection mirror, and a
    screen all disposed in a single, common housing space in the housing;
    a fan disposed proximate to the light source; and
    a first air guide path provided between the fan and the hollow wall, wherein hot air generated by the light source is exhausted by the fan and guided through the first guide path directly to the hollow wall, and the hollow wall is closed with respect to outside of the housing.

2. The projection display device according to claim 1, further comprising a second air guide path for returning the guided air radiating heat at the hollow wall to the light source.

3. The projection display device according to claim 1, wherein the hollow wall is formed of an extruded member.

4. The projection display device according to claim 1, wherein a duct is formed between the hollow wall and an exterior of the housing, and the duct is located outside of the single, common housing space.

5. The projection display device according to claim 1, wherein the hollow wall forms a portion of the single, common housing space, and the hallow wall forms an air guide with an exterior wall surface of the housing.

* * * * *